United States Patent [19]
Caveney

[11] Patent Number: 5,193,250
[45] Date of Patent: Mar. 16, 1993

[54] RELEASABLE CABLE TIE
[75] Inventor: Jack E. Caveney, Hinsdale, Ill.
[73] Assignee: Panduit Corp., Tinley Park, Ill.
[21] Appl. No.: 876,655
[22] Filed: Apr. 30, 1992
[51] Int. Cl.$^5$ .............................................. B65D 63/00
[52] U.S. Cl. .................... 24/16 PB; 24/17 AP
[58] Field of Search .............. 24/16 PB, 16 R, 17 AP, 24/30.5 P, 23 B, 27

[56] References Cited
U.S. PATENT DOCUMENTS

| | | | |
|---|---|---|---|
| 3,339,246 | 9/1967 | Geisinger | 24/16 PB |
| 3,661,187 | 5/1972 | Caveney et al. | 140/123.6 |
| 3,908,233 | 9/1975 | Caveney et al. | 24/16 |
| 3,991,444 | 11/1976 | Bailey | 24/16 |
| 4,236,280 | 12/1980 | Kreiseder | 24/16 |
| 4,413,380 | 11/1983 | Suzuki | 24/16 |
| 4,490,887 | 1/1985 | Sarton et al. | 24/16 |
| 4,776,067 | 10/1988 | Sorensen | 24/16 PB |

FOREIGN PATENT DOCUMENTS

| | | | |
|---|---|---|---|
| 2528724 | 2/1976 | Fed. Rep. of Germany | 24/16 PB |
| 2556411 | 6/1977 | Fed. Rep. of Germany | 24/16 PB |
| 2145150 | 3/1985 | United Kingdom | 24/16 PB |

Primary Examiner—Victor N. Sakran
Attorney, Agent, or Firm—Charles R. Wentzel; Mark D. Hilliard

[57] ABSTRACT

A releasable cable tie having a pawl extension projecting from the cable tie's strap positioning channel allows application by a standard cable tie tensioning and severing tool by providing a tool positioning surface formed on the locking head adjacent the strap exit portion of the strap positioning channel, the tool positioning surface projecting beyond the distal end of the extension of the pawl such that a cable tie application tool can be positioned in abutment with the tool positioning surface without contacting the extension of the pawl.

4 Claims, 2 Drawing Sheets

RELEASABLE CABLE TIE

TECHNICAL FIELD

The present invention relates generally to cable ties or elongate straps having a locking head at a first end that secures a second end of the strap to form a loop fastener and relates specifically to reusable cable ties having releasable locking mechanisms that allow removal of the second end of the strap from the locking head without destroying the locking mechanism such that a cable tie can be removed and reused.

BACKGROUND OF THE INVENTION

Prior releasable cable ties are best illustrated by U.S. Pat. Nos. 3,908,233 and 3,991,444, which are assigned to common assignee Panduit Corp. These releasable cable ties provide an extension formed on the strap locking pawl which projects out of the exit of the strap channel of the head of the cable tie. The pawl extension extends from the head of the cable tie an amount sufficient to allow manipulation of the extension to pivot the locking pawl out of engagement with teeth on the strap of the cable tie and release the strap from the head.

Although the extension of the pawl from the head of the cable tie is an effective and reliable means for releasing the locking mechanism of a cable tie, projection of extension from the head of the cable tie interferes with and prevents the use of a standard cable tie tensioning tool for tensioning and severing the strap of the cable tie since the necessary abutment of the nose of the tool and the head of the cable tie cannot be accomplished without engaging the extension of the pawl which prevents free movement of the pawl during threading of the strap through the head and results in destruction of the pawl as the strap is drawn past it by the tool. Thus, there is a need for a releasable cable tie that overcomes this disadvantage.

SUMMARY OF THE INVENTION

It is an object of the present invention to provide a releasable cable tie that can be applied by a standard cable tie tensioning and strap severing tool.

In general a releasable cable tie includes an elongate strap, a locking head formed at a first end of the strap, the locking head including first and second side walls and first and second end walls that define therebetween a strap positioning channel having a strap entrance portion and a strap exit portion, a locking pawl disposed in the channel in a position adapted to allow insertion of a free end of the strap through the strap entrance portion past the pawl while preventing withdrawal of the strap to lock the strap to the locking head, wherein the locking pawl includes an extension projecting through the strap positioning channel, past the strap exit portion of the strap positioning channel and out of the strap positioning channel, the extension being of sufficient length to allow engagement of a distal end of the extension to pivot the locking pawl and release the strap from the locking pawl, and a tool positioning surface formed on the locking head adjacent the strap exit portion of the strap positioning channel the tool positioning surface projecting beyond the distal end of the extension of the pawl such that a cable tie application tool can be positioned in abutment with the tool positioning surface without contacting the extension of the pawl.

DESCRIPTION OF THE PREFERRED EMBODIMENTS

Figure 6:
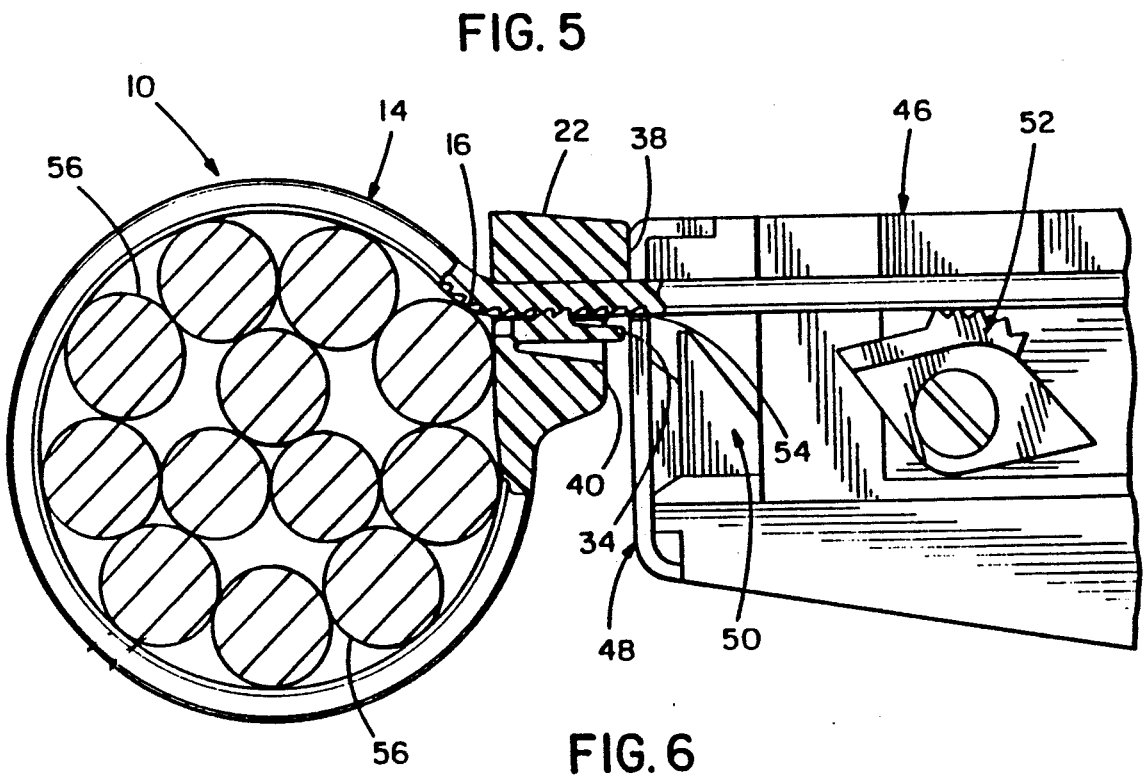
FIG. 6 is a fragmentary side view partially in section of a releasable cable tie being applied by a standard cable tie tensioning and severing application tool.

A releasable cable tie embodying the concept of the present invention is designated generally by the numeral 10 in the accompanying drawings. In general, the construction of cable tie 10 is functionally similar to the releasable one-piece cable tie disclosed in U.S. Pat. No. 3,908,233 which is incorporated herein by reference. Cable tie 10 is integrally formed of nylon plastic resin and includes a head 12 and a strap 14. Strap 14 is formed in any desired length necessary to encompass the diameter of the object to be fastened, only a portion of strap 14 being shown in FIGS. 1–6. As seen in FIG. 6, strap 14 includes a plurality of teeth 16 longitudinally spaced along an inner surface of strap 14.

Figure 3:
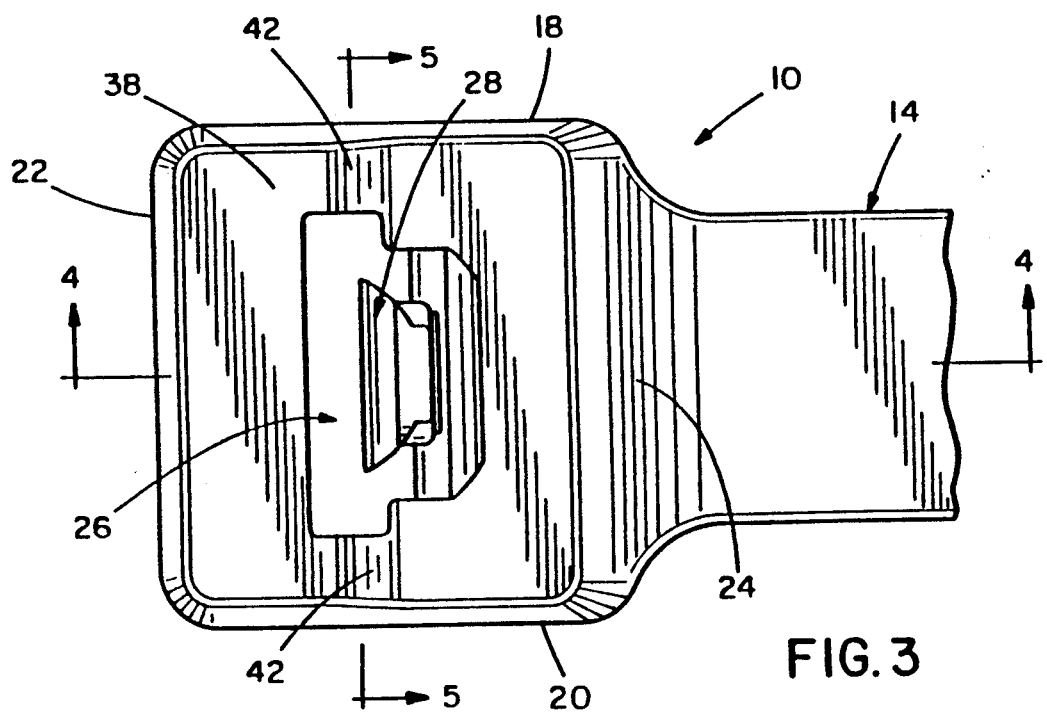
FIG. 3 is a fragmentary top view of the releasable cable tie FIG. 1.
Figure 4:
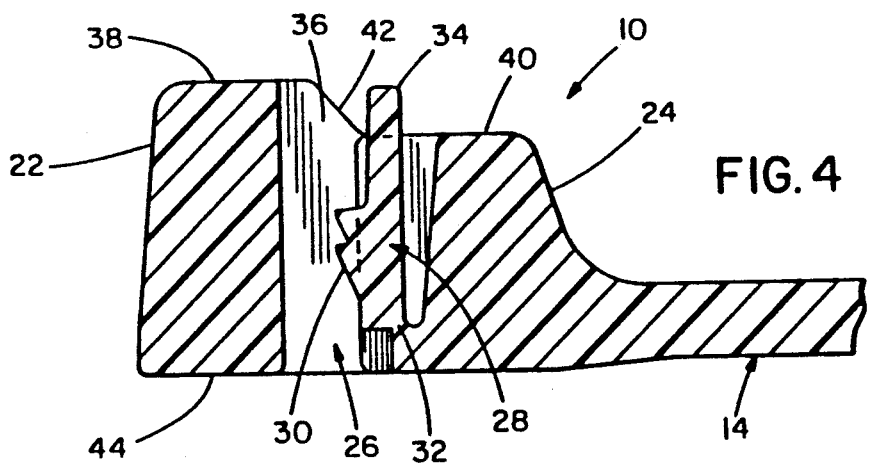
FIG. 4 is a sectional view taken along line 4—4 of FIG. 3.
Figure 5:
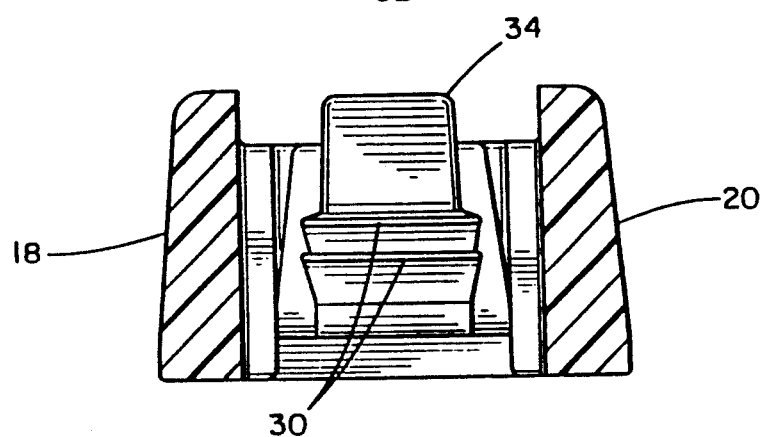
FIG. 5 is a sectional view taken along line 5—5 of FIG. 3.

As seen in FIG. 3, head 12 is formed with first and second side walls 18 and 20 and first and second end walls 22 an 24 that define therebetween a strap positioning channel 26. Formed in strap channel 26 is a locking pawl 28 having a plurality of teeth 30 (FIGS. 4 and 5) disposed to engage teeth 16 (FIG. 6) of strap 14 when strap 14 is inserted in channel 26, a pivotal hinge 32 (FIG. 4) connecting pawl 28 to second end wall 24 and an extension 34 that projects upwardly at the distal end of pawl 28.

Figure 1:
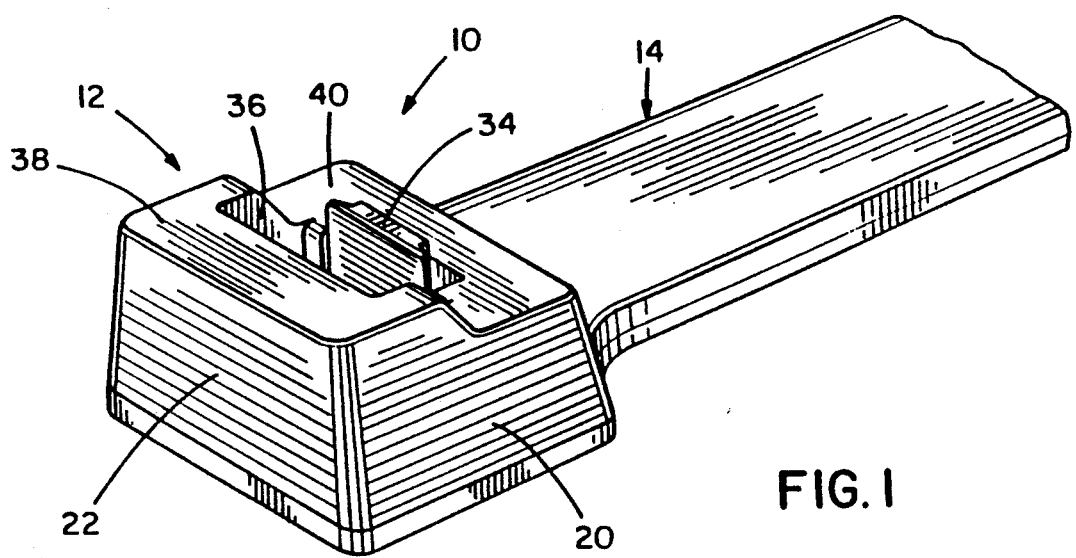
FIG. 1 is a fragmentary perspective view of a releasable cable tie embodying the concept of the present invention.
Figure 2:
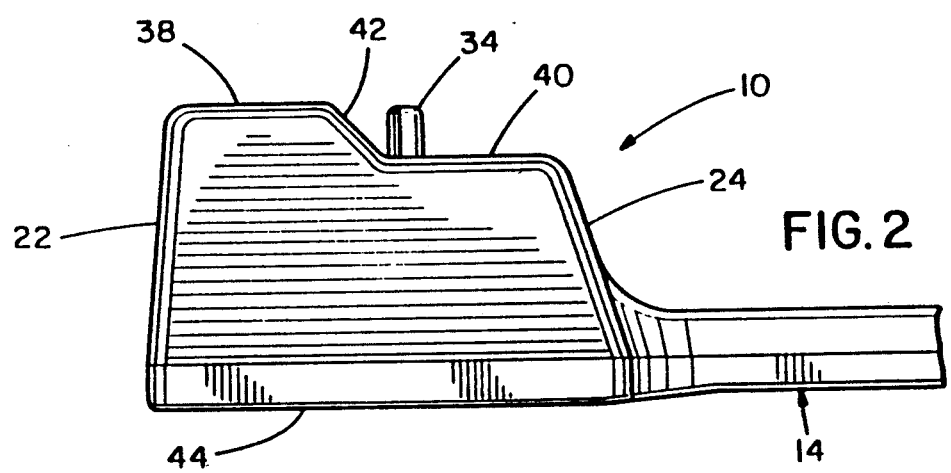
FIG. 2 is a fragmentary side view of the releasable cable tie of FIG. 1.

First and second side walls 18 and 20 and first and second end walls 22 and 24 terminate at a strap exit portion 36 (FIG. 1) of channel 26 in an upper planar surface 38 and a lower planar surface 40 connected by inclined lateral surfaces 42 (FIG. 2). Entry surface 44 (FIG. 2) terminates walls 18, 20, 22 and 24 adjacent the entrance to channel 26.

As seen in FIG. 6, cable tie 10 can be applied by standard cable tie tensioning and strap severing application tool 46 which is well known in the art and is described in detail in U.S. Pat. No. 3,661,187 which is incorporated herein by reference. Tool 46 includes a nose plate 48 that abuts upper planar surface 38 of cable tie 10, a strap severance blade 50 and a cable tie strap engagement pawl 52. A strap received through a slot 54 in nose plate 48 is withdrawn by the mechanism of tool 46 drawing strap 14 progressively tighter around wires 56 until a predetermined tension is sensed in strap 14 of cable tie 10 which actuates severance blade 50 to sever the excess portion of strap 14.

Extension 34 of pawl 28 is spaced inwardly from upper planar surface 38 with upper planar surface 38 formed adjacent strap exit portion 36 projecting beyond the distal end of extension 34 acting as a tool positioning surface such that tool 46 can be positioned to abut only upper planar surface 38 such that the application force induced by tool 46 in head 12 of cable tie 10 is applied only to planar surface 38. With tool 46 disposed in abutment with upper planar surface 38, extension 34 and thus pawl 28 are free to move as tool 46 withdraws strap 14 through head 12 and thus tool induced damage to pawl 28 is prevented.

Lower planar surface 40 is formed adjacent strap exit portion 36 disposed below the distal end of extension 34 of pawl 28 such that access to pawl 28 is facilitated for release of pawl 28 by actuating extension 34.

Cable tie 10 could be modified to include a secondary tool positioning surface (not shown) formed on surface 40 and preferably covering only a portion of lower planar surface 40. The secondary tool positioning surface would extend beyond the distal end of extension 34 of pawl 28 in substantial alignment with upper planar surface 38 to provide a secondary support for tool 46. The size and location of secondary tool positioning surface would be chosen to provide secondary support for tool 46 while minimizing interference with the actuation of extension 34 to release cable tie 10.

While the particular embodiments of the present invention have been shown and described, it will be obvious to those skilled in the art that changes and modifications may be made without departing from the invention in its broader aspects. The matter set forth in the foregoing description and accompanying drawings is offered by way of illustration only and not as a limitation. The actual scope of the invention is intended to be defined in the following claims when viewed in their proper perspective based on the prior art.

I claim:

1. A releasable cable tie, comprising:
    an elongate strap;
    a locking head formed at a first end of the strap, the locking head including first and second side walls and first and second end walls that define therebetween a strap positioning channel having a strap entrance portion and a strap exit portion;
    a locking pawl disposed in the channel in a position adapted to allow insertion of a free end of the strap through the strap entrance portion past the pawl while preventing withdrawal of the strap to lock the strap to the locking head, wherein the locking pawl includes an extension projecting through the strap positioning channel, past the strap exit portion of the strap positioning channel and out of the strap positioning channel, the extension being of sufficient length to allow engagement of a distal end of the extension to pivot the locking pawl and release the strap from the locking pawl;
    a tool positioning surface formed on the locking head adjacent the strap exit portion of the strap positioning channel the tool positioning surface projecting beyond the distal end of the extension of the pawl such that a cable tie application tool can be positioned in abutment with the tool positioning surface without contacting the extension of the pawl; and
    a second pawl access surface formed on the locking head adjacent the strap exit portion of the strap positioning channel where the second surface is disposed below the distal end of the extension of the pawl such that access to the extension is facilitated.

2. A releasable cable tie as set forth in claim 1, wherein the tool positioning surface is a planar surface.

3. A releasable cable tie as set forth in claim 2, wherein the tool positioning surface is disposed on an outer end wall of the head and wherein the second surface is disposed adjacent the strap of the cable tie.

4. A releasable cable tie as set forth in claim 2, including a secondary tool positioning surface formed on the second pawl access surface extending beyond the distal end of the extension such that the tool can be positioned in abutment with the secondary tool positioning surface without contacting the extension of the pawl.

* * * * *